Jan. 16, 1945. W. A. RIDDELL 2,367,526
AERIAL CAMERA SHUTTER
Filed July 3, 1941 2 Sheets-Sheet 1

William A. Riddell
INVENTOR

BY
ATTORNEYS

William A. Riddell
INVENTOR

Patented Jan. 16, 1945

2,367,526

UNITED STATES PATENT OFFICE 2,367,526

AERIAL CAMERA SHUTTER

William A. Riddell, Rochester, N. Y., assignor to Eastman Kodak Company, Rochester, N. Y., a corporation of New Jersey Application July 3, 1941, Serial No. 400,931

8 Claims. (Cl. 95—63)

This invention relates to photography and more particularly to shutters for photographic cameras. One object of my invention is to provide a shutter having a relatively large exposure aperture with shutter blades which can rapidly open and close the exposure aperture. Another object of my invention is to provide a shutter particularly suited for aviation work where lenses of comparatively long focal lengths and relative wide apertures are usually employed. Another object of my invention is to provide a duplex type of shutter with two sets of shutter blades, one adapted to be moved rapidly and the other adapted to be moved more slowly, the first set of shutter blades being capable of making a rapid exposure when the second set of shutter blades is opened and closed.

Another object of my invention is to provide a relatively inexpensive type of camera shutter in which two sets of blades are used, one set of blades being so arranged that they can be rotated continuously while the other set is operated only intermittently to make an exposure when both the intermittently operated set of shutter blades and the continuously operated set of shutter blades are operated in synchronism. Other objects will appear from the following specification, the novel features being particularly pointed out in the claims at the end thereof.

Coming now to the drawings wherein like reference characters denote like parts throughout:

My invention comprises broadly providing two sets of shutter blades, one of which may be operated continuously to repeatedly open and close an exposure aperture so that this set of blades may be brought up to speed before an exposure is to be made, and a second set of shutter blades which are only operated at the time an exposure is to be made. The second set of shutter blades moves considerably slower than the first set, the relative speed of the two sets being more or less controlled by the proportion of time it takes the first set of shutter blades to uncover and cover the aperture.

In some cameras, and particularly in cameras used for mapping work, it is desirable to provide a shutter having a large aperture or exposure opening. Usually it is very difficult to obtain a shutter having a large aperture, such for instance, as four inches in which the usual type of shutter blades can be opened and closed fast enough to accomplish the desired results. If an exposure of 1/300 of a second is to be obtained with such a large aperture, it is almost necessary to have shutter leaves in motion sometime before and after the actual exposure is made. It is also necessary to have a second set or perhaps even a third set of shutter blades which will operate in synchronism with fastly moving blades so that these may open and close in the usual manner to permit the fast moving blades to make an exposure. It is such a shutter which will now be described.

Figure 1:
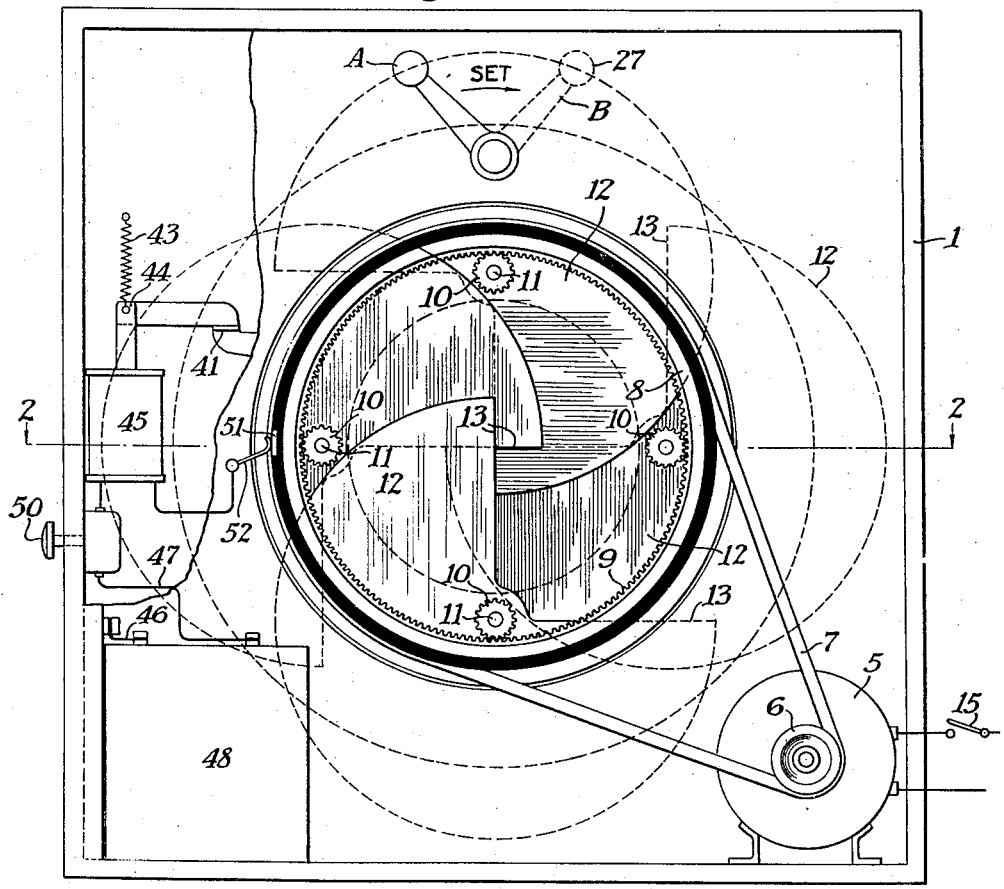
Fig. 1 is a front plan view with the cover partially broken away showing a shutter constructed in accordance with and embodying a preferred form of my invention.

Referring to Fig. 1, the shutter may include a case 1 having an exposure aperture 2 of relatively large size so that lens cells 3 and 4 may be supported by the casing 1 and may carry the elements of an objective in the usual manner. Such a shutter is often known as a "between-the-lens" type of shutter.

In the present instance, I provide two shutter mechanisms which are separate and which have their own driving motors. In the case of the first shutter mechanism I provide an electric motor 5 which may be mounted in the casing 1 having a pulley 6 supporting a belt 7 which drives a large ring gear 8. This ring gear may have internal teeth 9 meshing with a plurality of pinions 10 each carried by a shaft 11 and each supporting a shutter blade 12 which is disked shaped except for a substantial 90° cut formed by the intersecting walls 13.

In the present instance I have shown four of these shutter blades although any desired number of blades may be employed according to the size and speed of exposure desired.

When the motor 5 is operated through a suitable switch 15, diagrammatically shown in Fig. 1, the ring gear 8 will gradually get up to speed and as long as the motor operates the shutter blades 12 will likewise turn.

If these shutter blades are turned at such a speed that the exposure aperture 2 will be opened and closed in 1/300 of a second quite satisfactory mapping exposures can be made and I have selected this speed by way of illustration of a preferred embodiment of my invention.

Figure 2:
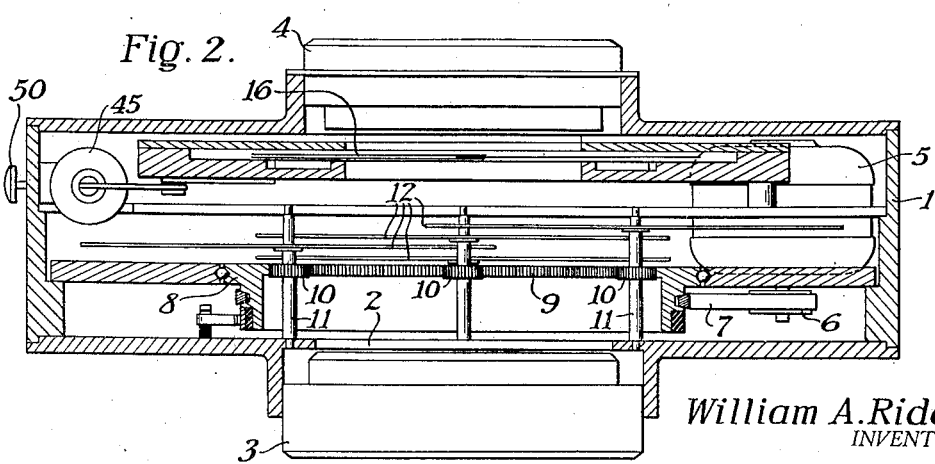
Fig. 2 is a section taken through the shutter shown in Fig. 1 on line 2—2 thereof.
Figure 3:
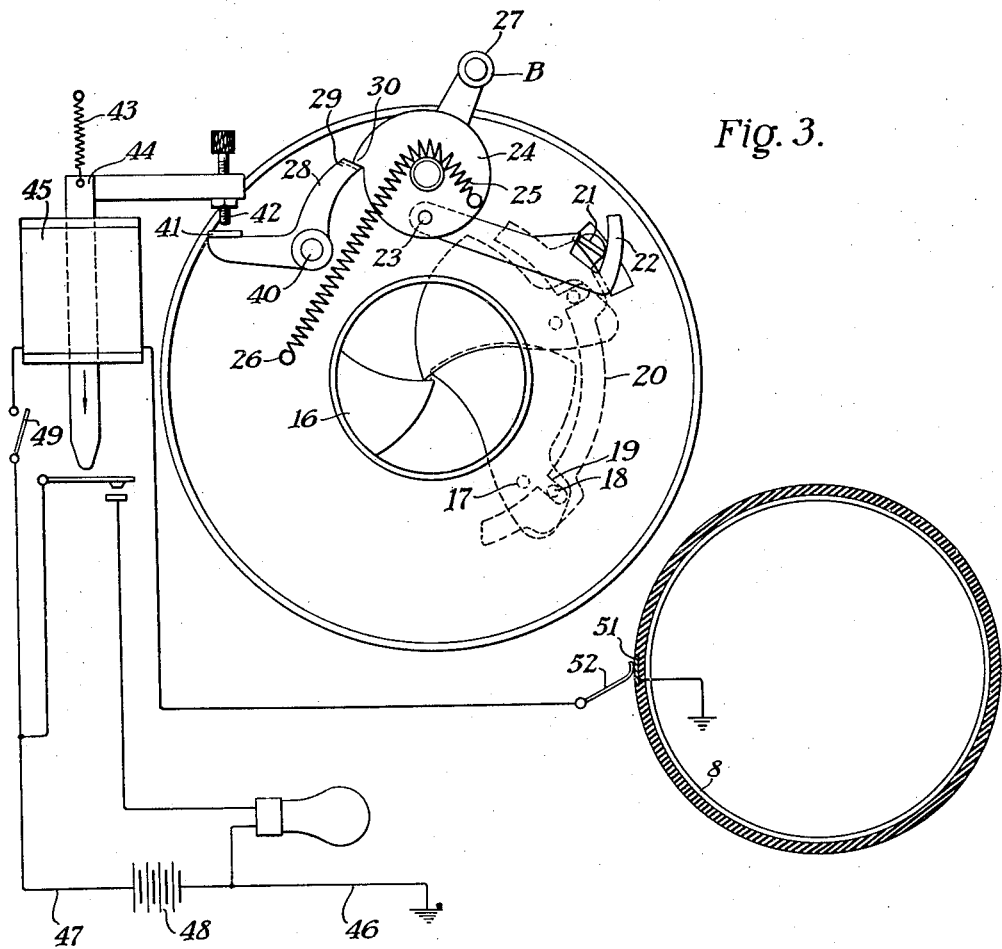
Fig. 3 is a fragmentary showing illustrating the intermittently operated set of shutter leaves and the synchronizing mechanism diagrammatically.

Coaxially arranged with the shutter blades 12 which form a first set of shutter blades are a second set of shutter blades 16, diagrammatically shown in Fig. 2 and shown in somewhat more detail in Fig. 3. This set of shutter blades is preferably of the type shown in my U. S. Patent 2,099,866, granted November 23, 1937, for Photographic shutter. The shutter mechanism may also be the same as shown in this patent.

In this type of shutter each shutter blade 16 is pivotally mounted at 17 and is driven by a pin 18 and slot 19 connected between the shutter blades and a blade ring 20. The blade ring 20 has an upstanding pin 21 which may be oscillated back and forth by the latch member 22 pivoted at 23 to a master member 24 which is moved by a spring 25 fastened to the master member and to a pin 26 in the shutter casing. This master member must be set or tensioned before an exposure by means of a handle 27 which must be moved from the full line position A in Fig. 1 which is its position of rest after an exposure has been made to its tension position shown at B in which the shutter is positioned for an exposure. When in a tensioned position the master member is held by a trigger 28 having a latch member 29 engaging a lug 30 on the master member, the trigger 28 being mounted on a stud 40 and having a flange 41 lying in the path of an adjustable plunger 42. This plunger is normally held upwardly by a spring 43 and includes an armature 44 passing through the coil 45 forming a solenoid. When a circuit between a negative wire 46 and a positive wire 47, each connected to a source of power, such a battery 48 is made, the solenoid will cause the shutter trigger to trip the shutter. This may be done by closing the switch 49 by pressing in on a push button 50 shown in Fig. 1. When this is done the circuit will be made only when a second switch formed by the switch member 51 which, in this instance, is carried by the ring gear 8 comes opposite the switch member 52 so that the complete circuit will only be made when the ring gear 8 is in predetermined position.

This position is selected so that the shutter blades of the first set of shutter blades 12 will be about to open so that when the circuit is made and the shutter blades of the second set of shutter blades 16 open the blades 12 may open and close and the blades 16 may again close before the blades 12 are opened again.

The speed relationship of the blades 16 to the blades 12 is approximately in the present instance 3 to 1. In other words, the shutter blades of the second set of blades 16 may take approximately 1/100 of a second to open and close whereas the continuously rotating set of shutter blades 12 open and close in approximately 1/300 of a second. Thus, each time the release button is depressed after the setting lever 27 has been moved to its B position, a single exposure will be made as soon as the switch members 51 and 52 contact. Thus the exposure is solely made by the first set of shutter blades which may move continuously and which would make repeated exposures except for the fact that they are only uncovered momentarily by the second set of shutter blades 16.

I claim:

1. A shutter for photographic cameras of the type including an exposure aperture, the combination with a casing, of two separate sets of shutter leaves each adapted to cover and uncover the exposure aperture, a motor means connected to one set of shutter leaves for moving the leaves rapidly to cover and uncover the exposure aperture repeatedly, a separate driving means for the second set of shutter leaves and connected to the leaves for operating the leaves to open and close the shutter aperture singly and means to synchronize the first and second sets of shutter blades so that one of the repeated operations of the first set of blades may make an exposure by opening and closing during the single operation of the second set of shutter blades, said synchronizing means comprising an electric circuit, a switch for making the circuit when the first set of shutter leaves are in a predetermined position, and a magnet for releasing the driving means for the second set of shutter leaves.

2. A shutter for photographic cameras of the type including an exposure aperture, the combination with a casing, of two separate sets of shutter leaves each adapted to cover and uncover the exposure aperture, a motor means connected to one set of shutter leaves for moving the leaves rapidly to cover and uncover the exposure aperture repeatedly, a separate driving means for the second set of shutter leaves and connected to the leaves for operating the leaves to open and close the shutter aperture singly and means to synchronize the first and second sets of shutter blades so that one of the repeated operations of the first set of blades may make an exposure by opening and closing during the single operation of the second set of shutter blades, said synchronizing means comprising an electric circuit, a switch for making the circuit including a shutter blade driving ring for moving the first set of blades for making the circuit when the first set of shutter leaves are in a predetermined position, a magnet in the circuit for releasing the driving means for the second set of shutter blades, and a switch also in the circuit for closing the circuit to make an exposure.

3. In a shutter for photographic cameras of the type including an exposure aperture, the combination with a casing, of two separate sets of shutter leaves mounted therein, each set being movably mounted to open and close the exposure aperture, a power drive, a rotatable blade ring and connections between each of the first set of shutter blades and the blade ring for rotating the blades to repeatedly open and close the shutter aperture at a predetermined high speed, means for moving the second set of shutter blades, a second power drive connected to the second set of shutter blades and adapted to drive said blades at a materially slower speed than the speed of the first set of blades and to drive said blades for a single operation of the blades, and means for synchronizing the first and second sets of shutter blades whereby an exposure may be made by rotating the first set of shutter blades to make an exposure while the second set of slower moving shutter blades open and close once.

4. In a shutter for photographic cameras, the combination of a casing including an exposure aperture, and two sets of movably mounted shutter blades for opening and closing said aperture, the first set of shutter blades including pivotal mounts, pinions thereon and a ring gear meshing with the pinions, and a motor for rotating the shutter blades to repeatedly uncover and cover the exposure aperture, the second set of blades including pivotal mounts, means for oscillating the shutter blades thereon including a power drive and connections between the blades and power drive, a synchronizing circuit including a switch for making the circuit, one part of said switch being positioned for making the circuit for each revolution of the first set of shutter blades, a trip for the second set of shutter blades, means for operating the trip controlled by making the circuit, said synchronizing circuit tripping the second set of blades to make an exposure through the first set of rotating blades while the second set of shutter blades are open.

5. In a shutter for photographic cameras, the combination of a casing including an exposure aperture, and two sets of movably mounted shutter blades for opening and closing said aperture, the first set of shutter blades including pivotal mounts, pinions thereon and a ring gear meshing with the pinions, and a motor for rotating the shutter blades to repeatedly uncover and cover the exposure aperture, the second set of blades including pivotal mounts, means for oscillating the shutter blades thereon including a power drive and connections between the blades and power drive, a synchronizing circuit including a switch for making the circuit, one part of said switch being positioned for making the circuit for each revolution of the first set of shutter blades, a trip for the second set of shutter blades, means for operating the trip controlled by making the circuit, and a push button shutter release switch mounted in the circuit whereby the switch operable by the rotation of the first set of blades may trip the driver of the second set of blades to make an exposure therethrough.

6. In a shutter for photographic cameras, the combination of a casing including an exposure aperture, and two sets of movably mounted shutter blades for opening and closing said aperture, the first set of shutter blades including pivotal mounts, pinions thereon and a ring gear meshing with the pinions, and a motor for rotating the shutter blades to repeatedly uncover and cover the exposure aperture, said rotary blades having an overlap and being open through approximately one quarter of each revolution, the second set of shutter blades including pivotal mounts, a power drive, mechanism connecting the power drive and second set of blades for operating said blades at a speed of approximately one third of the speed of the rotary blades, and a synchronizing device for tripping the second set of shutter blades so they may open and an exposure can be made by the first set of shutter blades while the second set of shutter blades are open, said power drive closing the second set of blades before a second exposure is made by the first set of blades.

7. In a shutter for photographic cameras, the combination of a casing including an exposure aperture, and two sets of movably mounted shutter blades for opening and closing said aperture, the first set of shutter blades including pivotal mounts, pinions thereon and a ring gear meshing with the pinions, and a motor for rotating the shutter blades to repeatedly uncover and cover the exposure aperture, the second set of blades including pivotal mounts, means for oscillating the shutter blades thereon including a power drive and connections between the blades and power drive, manual means for setting the power drive for the second set of blades, a synchronizing circuit including a switch for making the circuit, one part of said switch being positioned for making the circuit for each revolution of the first set of shutter blades, a trip for the second set of shutter blades, means for operating the trip controlled by making the circuit, said synchronizing circuit tripping the second set of blades, after the power drive has been manually set to make an exposure through the first set of rotating blades while the second set of shutter blades are open.

8. In a shutter for photographic cameras, the combination of a casing including an exposure aperture, and two sets of movably mounted shutter blades for opening and closing said aperture, the first set of shutter blades including pivotal mounts, pinions thereon and a ring gear meshing with the pinions, and an electric motor for rotating the shutter blades at a known speed to repeatedly uncover and cover the exposure aperture at a known speed, the second set of blades including pivotal mounts, means for oscillating the shutter blades thereon including a power drive and connections between the blades and power drive, for opening and closing the blades at approximately one third the speed of the first set of shutter blades, a synchronizing circuit including a switch for making the circuit, one part of said switch being positioned for making the circuit for each revoluton of the first set of shutter blades, a trip for the second set of shutter blades, means for operating the trip controlled by making the circuit, said synchronizing circuit tripping the second set of blades to make an exposure through the first set of rotating blades while the second set of shutter blades are open.

WILLIAM A. RIDDELL.